United States Patent
Hazelton (10) Patent No.: US 9,682,646 B2
(45) Date of Patent: Jun. 20, 2017

(54) MODULAR BROADCAST SPREADER

(71) Applicant: Richard George Hazelton, Cudal (AU)

(72) Inventor: Richard George Hazelton, Cudal (AU)

(*) Notice: Subject to any disclaimer, the term of this patent is extended or adjusted under 35 U.S.C. 154(b) by 8 days.

(21) Appl. No.: 14/832,282

(22) Filed: Aug. 21, 2015

(65) Prior Publication Data

US 2016/0114714 A1 Apr. 28, 2016

(30) Foreign Application Priority Data

Oct. 28, 2014 (AU) ................. 2014904313

(51) Int. Cl.
| | |
|---|---|
| *B65G 47/18* | (2006.01) |
| *A01C 7/00* | (2006.01) |
| *B60P 1/38* | (2006.01) |
| *A01C 15/00* | (2006.01) |
| *A01M 9/00* | (2006.01) |
| *A01B 71/08* | (2006.01) |
| *A01C 15/12* | (2006.01) |
| *A01C 17/00* | (2006.01) |

(52) U.S. Cl.
CPC ............. *B60P 1/38* (2013.01); *A01B 71/08* (2013.01); *A01C 15/005* (2013.01); *A01C 15/006* (2013.01); *A01C 15/122* (2013.01); *A01M 9/0084* (2013.01); *A01C 17/001* (2013.01)

(58) Field of Classification Search
CPC ............................ B65G 47/18; A01C 7/085
USPC ......... 198/540, 544, 545, 820, 860.1, 861.1
See application file for complete search history.

(56) References Cited

U.S. PATENT DOCUMENTS

| | | | | | |
|---|---|---|---|---|---|
| 3,559,893 | A * | 2/1971 | Gruben | ............. | B60P 1/40 198/669 |
| 3,990,588 | A * | 11/1976 | Dibben | ............. | B65D 90/587 198/532 |
| 4,724,953 | A * | 2/1988 | Winchester | ............. | B65G 45/10 198/836.3 |
| 4,858,751 | A * | 8/1989 | Hodlewsky | ............. | B65G 17/08 198/325 |
| 5,762,712 | A * | 6/1998 | Sohn | ............. | B05C 19/04 118/419 |
| 6,112,875 | A * | 9/2000 | Gibson | ............. | B65G 13/00 193/35 R |
| 6,135,171 | A * | 10/2000 | Weakly | ............. | B65G 47/44 141/286 |
| 6,340,279 | B1 * | 1/2002 | Wipf | ............. | B65D 88/28 198/540 |
| 6,427,831 | B1 * | 8/2002 | Norton | ............. | B65G 21/06 198/841 |
| 7,232,023 | B2 * | 6/2007 | Ellis | ............. | B65G 11/166 193/2 R |
| 7,296,531 | B2 * | 11/2007 | Muniga | ............. | A23P 20/12 118/18 |
| 7,849,999 | B1 * | 12/2010 | Cooley | ............. | B65G 15/60 198/813 |

(Continued)

*Primary Examiner* — Douglas Hess
(74) *Attorney, Agent, or Firm* — Brake Hughes Bellermann LLP (57) ABSTRACT

The invention comprises a chassis rail comprising an elongate frame member having a first end for mounting a head pulley and a second end for mounting a tail pulley; a first plurality of spaced-apart apertures to allow visual inspection of a plurality of bed rollers; and a second plurality of spaced-apart apertures to allow visual inspection of a plurality of return rollers.

14 Claims, 11 Drawing Sheets

(56) References Cited

U.S. PATENT DOCUMENTS

| | | | | |
|---|---|---|---|---|
| 8,006,831 B1* | 8/2011 | Mackin | ............... | B65G 21/14 |
| | | | | 198/812 |
| 8,556,066 B2* | 10/2013 | Honegger | ............. | B65G 65/42 |
| | | | | 198/550.2 |
| 8,752,694 B2* | 6/2014 | Putman | ............... | B65G 41/00 |
| | | | | 198/311 |
| 8,827,069 B2* | 9/2014 | Freehill | ............ | A01D 41/1217 |
| | | | | 198/588 |
| 9,440,794 B2* | 9/2016 | Geysen | ............... | B65G 21/20 |

* cited by examiner

MODULAR BROADCAST SPREADER

RELATED APPLICATION

This application claims priority to Australian Application No. 2014904313, filed Oct. 28, 2014, entitled "Modular Broadcast Spreader." The subject matter of this earlier filed application is incorporated herein by reference.

This invention relates to devices for dispersing finely divided particulate material. In particular, the invention relates to a modular broadcast spreader and components thereof used for the distribution of fertiliser, pesticides, seeds and other finely divided material to the soil or vegetation.

DESCRIPTION OF THE RELATED ART

Broadcast spreaders are known for dispersing particulate materials. On large capacity broadcast spreaders, a belt conveyor is typically used to assist in the discharge of particulate material from a hopper onto a rotating spreading disc. Conventional hoppers are typically formed by two pairs of sidewalls that converge downwardly to define a generally horizontal elongate discharge aperture through which particulate material loaded into the hopper can be fed onto the conveyor belt located between two chassis rails. Such hoppers are generally welded to the chassis rails along the lengths of the two sidewalls adjacent to the discharge aperture. In such a configuration, removal of the hopper, such as for the maintenance of the conveyor belt mechanism is a lengthy and tedious process.

Large trailers may also rely on a conveyor belt mechanism to assist with the dispensing of loads. Unfortunately, in both broadcast spreaders and trailers which have a conveyor belt, it is common for debris from the load that is being dispensed to enter the conveyor belt mechanism. The ingress of debris into the conveyor belt mechanism causes undesirable wear and tear. A considerable amount of debris falls upon the inner side of the belt, from where it is then carried under the tail pulley, where it gradually accumulates as the pulleys continue to rotate. Though some debris may possibly dislodge, the debris under the centre of the head and tail pulleys gradually increases in thickness, so that the belt crown, extending along the centre of the belt, becomes stretched and deformed. This reduces the belt's efficiency and longevity. In extreme cases, the pulleys and rollers which form part of the conveyor belt mechanism may become damaged or dislodged, and require replacement.

Thus, maintenance of the conveyor belt, pulleys and rollers upon which the belt travels is often required. Visual inspection of the conveyor belt mechanism requires the conveyor belt, pulleys and rollers to be removed from between the pair of chassis rails which again is a lengthy and tedious process.

Accordingly, it can be seen that a need exists for a broadcast spreader and components thereof designed and developed to overcome, or at least substantially ameliorate, the disadvantages and shortcomings of the prior art.

SUMMARY OF THE INVENTION

According to a first aspect, the invention resides broadly in a chassis rail comprising an elongate frame member having a first end for mounting a head pulley and a second end for mounting a tail pulley; a first plurality of spaced-apart apertures to allow visual inspection of a plurality of bed rollers; and a second plurality of spaced-apart apertures to allow visual inspection of a plurality of return rollers.

Preferably, the first plurality of spaced-apart apertures, and the second plurality of spaced-apart apertures, are substantially evenly spaced.

In another aspect, the invention resides broadly in a broadcast spreader comprising a pair of chassis rails, each chassis rail including an outwardly extending upper flange; a hopper having an upper portion and a lower portion, the upper portion having two side walls which inwardly converge, and a lower portion in which the side walls outwardly diverge and then extend substantially vertical; wherein the upper portion of the hopper is supported by the outwardly extending upper flanges and the lower portion of the hopper is removably secured to the chassis rails.

Preferably the side walls have a support flange which abuts the outwardly extending upper flange. In one preferred embodiment, the hopper is removably secured to the outwardly extending upper flange.

In a further aspect, the invention resides broadly in a self-cleaning pulley suitable for a pair of chassis rails comprising a plurality of spaced-apart support plates with openings, affixed on a shaft having a first end and a second end; a plurality of spaced-apart frame members affixed to the support plates to form an outer surface of the pulley, and a plurality of auger members affixed to the shaft between said support plates, wherein each auger member has a spiral flight portion extending around said shaft to direct debris from a centre portion of the shaft towards the ends of the shaft for expulsion through the openings of the support plates.

Preferably, the frame members are evenly spaced, and the plurality of spaced-apart support plates are substantially equal in outer diametrical size.

Other aspects of the invention are disclosed by the claims.

BRIEF DESCRIPTION OF THE DRAWINGS

It will be appreciated by those of relevant skill that the disclosed embodiments are merely exemplary of the invention, and that the invention may be embodied in various and alternative forms. The invention will now be described in a non-limiting manner with reference to the accompanying drawings which illustrate a preferred embodiment of the invention, wherein.

It will be appreciated by those of relevant skill that the figures are not necessarily to scale, with some features exaggerated or minimised to show details of particular components.

Like numerals in the drawings refer to like parts.

DETAILED DESCRIPTION OF PREFERRED EMBODIMENTS

In the following discussion and in the claims that follow, the term "particulate material" denotes a bulk of particles in their broadest meaning including powders, granular material, seeds, pellets and the like, which can include, for example, fertilizer, pesticides, chemicals, insecticides, weed killers, herbicides, ice salt, calcium chloride and like materials.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment", "alternative embodiment" and the like mean "one or more (but not all) embodiments of the disclosed invention(s)", unless expressly specified otherwise. A reference to "another embodiment" in describing an embodiment does not imply that the referenced embodiment is mutually exclusive with another embodiment (e.g., an embodiment described before the referenced embodiment), unless expressly specified otherwise.

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

The terms "including", "comprising" and variations thereof mean "including but not limited to", unless expressly specified otherwise. The terms "a", "an" and "the" mean "one or more", unless expressly specified otherwise. The term "plurality" means "two or more", unless expressly specified otherwise.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

Figure 1:
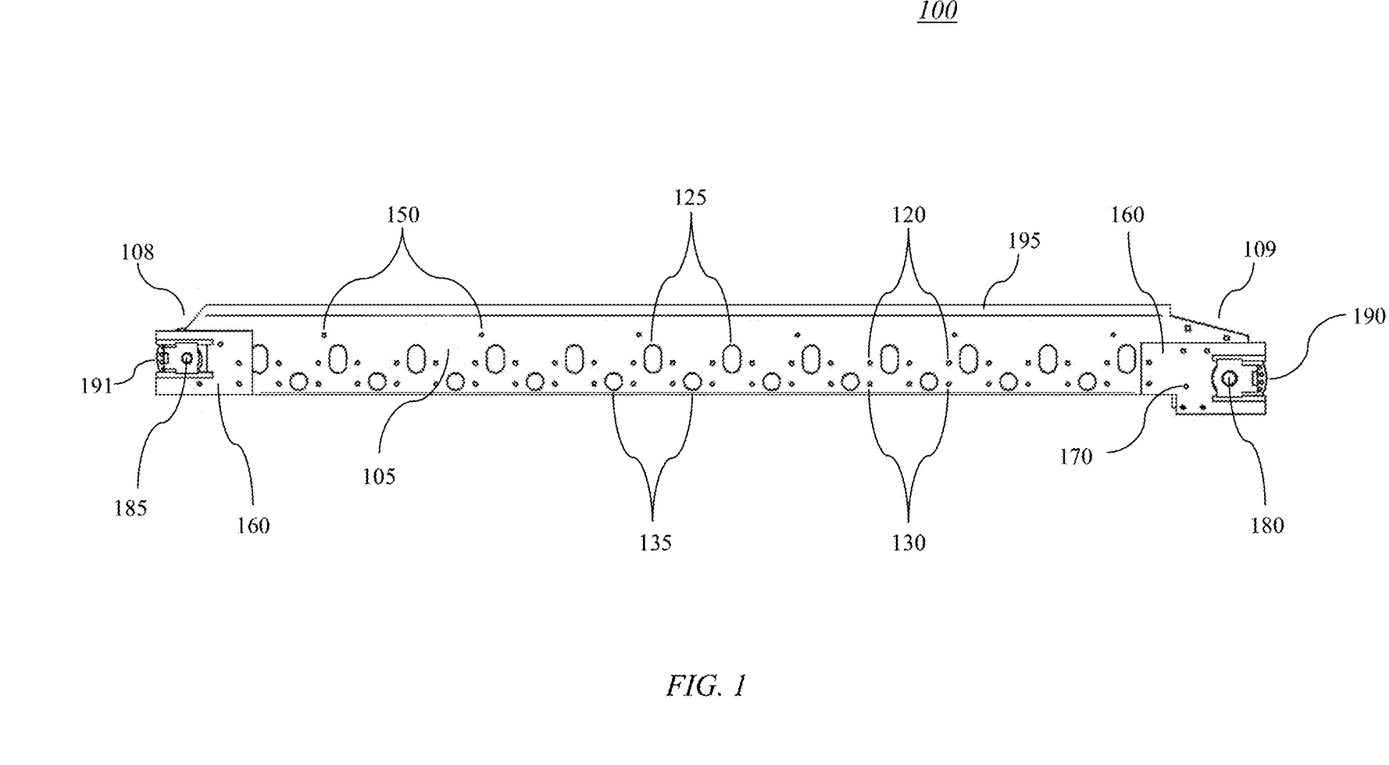
FIG. 1 is a side view of a chassis rail.

Turning now to FIG. 1, a chassis rail 100 suitable for a broadcast spreader comprises an elongate frame member 105 having a first end 108 and a second end 109. The frame member 105 is a unitary pressed or cast member, preferably made of metal such as various grades of hot-rolled steel, various grades of cold-rolled steel, or from stainless steel, titanium, aluminium and the like. The frame member 105 could also be made of any other suitably rigid material such as plastics (e.g. nylon), composites (e.g. fiberglass and/or carbon fibre construction), ceramics, or other similar materials. Factors involved in choosing a construction material include durability, tensile strength, hardness and cost.

A bearing support plate 160 located at each end 108 and 109 of the frame member 105 supports head pulley 180 and tail pulley 185. Preferably, each bearing support plate includes a mounting point 170 for a pinch roller. Head pulley 180 and tail pulley 185 extend transversely between a pair of chassis rails to carry conveyor belt 190 in an "endless loop" configuration, so that the conveyor belt forms a straight upper run portion and a lower run portion between the pulleys, while a semi-circular portion 191 thereof extends around the outer side of each of the pulleys.

The conveyor belt 190 is supported along its upper side by a series of bed rollers located between head pulley 180 and tail pulley 185. The frame member 105 provides a mounting point 120 for each bed roller. Similarly, the lower side of conveyor belt 190 is supported by return rollers. In an exemplary arrangement, the head pulley 180 has a diameter of approximately 250 mm and the tail pulley 185 has a diameter of approximately 150 mm. The bed rollers and return rollers are approximately 50 mm in diameter and are separated by approximately 200 mm.

The frame member 105 provides a mounting point 130 for each return roller. Conveyor belt 190 is driven by any suitable means, such as an hydraulic motor. During operation of the conveyor, the belt travels around the two rotating pulleys, so that material placed upon the top run is carried from the tail pulley toward the head pulley.

Located upon an upper edge of frame member 105 is an outwardly extending flange 195, which may be used to locate and support the walls of a hopper (not shown) to be discussed further below. A plurality of mounting points 150 allows the hopper to be secured to the chassis rail 100.

To allow for the visual inspection of each bed and return roller, a plurality of bed roller inspection apertures 125 and a plurality of return roller inspection apertures 135 are formed in each frame member 105. Preferably, the apertures 125 and 135 are substantially evenly spaced and are located between every other pair of bed and return rollers, respectively. Alternatively, apertures 125 and 135 may be located between every pair of bed and return rollers, respectively. In the embodiment shown, apertures 125 and 135 are horizontally offset from each other. However, alternative embodiments, in which apertures 125 and 135 are in a 'stacked' configuration, or form a single aperture for visual inspection of the adjacent bed and return rollers simultaneously, are also suitable. The apertures also allow for easy replacement and/or alignment of the bed rollers, if required.

For ease of maintenance, the bed and return rollers, as well as head pulley 180 and tail pulley 185 are bolted to the pair of chassis rails 100, though other suitable removable fastening means such as, but not limited to, threaded screws, latches, clasps, split pins, clips or any other comparable releasable fastening means may be used.

Because the present invention can be packaged and sold in a "knock-down" configuration and "flat packed," which is easily assembled by the purchaser, the present invention minimises the storage stocking or distribution space required of the vendor. The present invention can be flat packed, which makes it easier to stack and store the chassis rails on top of one another. Transportation costs are also reduced by transporting "knock-down" kits. Thus, the present invention is expected to reduce costs associated with the vendor's storage stocking and distribution space. Additionally, the present invention can be quickly and easily assembled and installed by the purchaser using only simple tools, such as an adjustable wrench and a screw driver.

Figure 2:
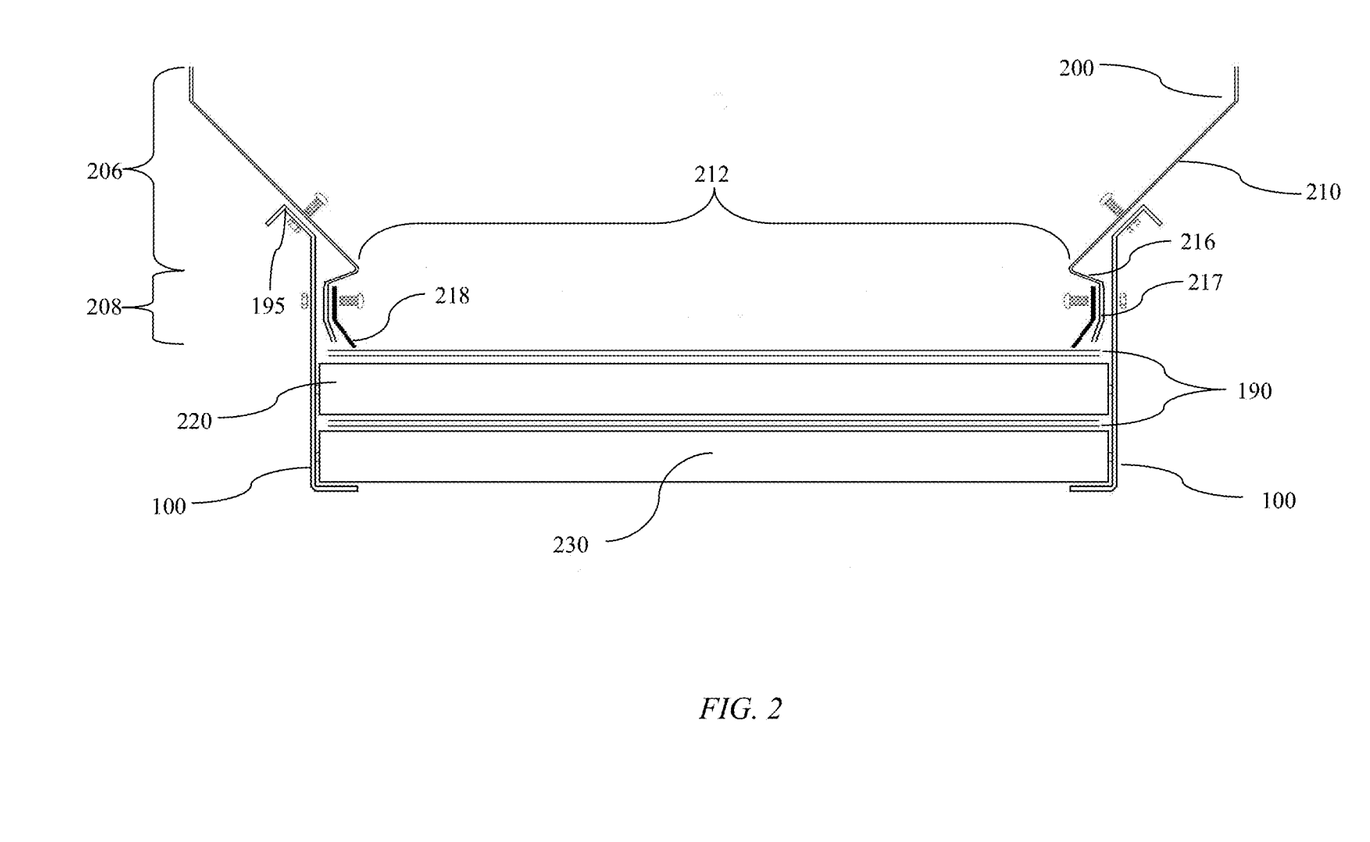
FIG. 2 is a cross sectional view of a hopper attached to a pair of chassis rails.

Referring to FIG. 2, the hopper 200 includes an upper chute portion 206 and a lower chute portion 208 located between a pair of chassis rails 100. The upper chute portion 206 has sides 210 that converge inwardly in the transverse direction of the conveyor belt 190 to define a first elongate discharge aperture 212. The discharge aperture 212 opens into the lower chute portion 208. Lower chute portion 208 includes two sides 216 diverging in the transverse direction of the conveyor belt 190 and extending downwardly from the discharge aperture 212. In this way the lower chute portion 208 forms a cavity adjacent the conveyor belt 190 which is wider than the discharge aperture 212, ie there is a widening of the aperture in the transverse direction of the belt. This allows material from the upper chute portion 206 of the hopper 200 to fall onto the conveyor belt 190 without the compaction of the particulate material encountered in the prior art arrangements. The upper run portion of conveyor belt 190 is supported by bed roller 220, while the lower run potion of the conveyor belt is supported by return roller 230.

Skirts 218 are provided at the bottom edges of downwardly depending sides 217, and are preferably adjustably mounted so as to move in a vertical and transverse direction in relation to conveyor belt 190. The skirts 218 act as an intermediary between the hopper 200 and the conveyor belt 190 to prevent the ingress of material into the conveyor belt mechanism. In one embodiment, the skirts 218 may include a plurality of elongate slots which cooperate with a plurality of bolts/nuts inserted through corresponding apertures in the downwardly depending sides 217. The elongate slots allow for vertical adjustment of the skirts 218 in relation to the conveyor belt 190, while the bolts/nuts allow for transverse adjustment of the skirts with respect to the conveyor belt. Advantageously, because the lower chute portion 208 is wider than the discharge aperture 212, the particulate material is able to run off the skirts 218 without significant build up of material on the skirts 218. In addition, because the skirts are displaced transversely outwardly from the edges of the discharge opening 212 there is significantly reduced downward pressure on the skirts in comparison to prior art configurations. This alleviates the pressure that would otherwise act to push the skirts into abrasive contact with the belt by providing room for the particulate material from the hopper to spread out as it falls through discharge aperture 212 onto conveyor belt 190. This avoids the problem of premature wear of the skirts 218 and to the conveyor belt 190 that typically result from such abrasive contact.

Preferably, downwardly depending sides 217 have an increased thickness relative to sides 210 and 216 of the hopper 200. This increases the strength and longevity of the lower chute portion 208 of the hopper 200, and ensures a stable mounting point for skirts 218. In an alternative embodiment, a strengthening plate may be welded to each downwardly depending side 217 to provide additional strength. Preferably, a lower portion of downwardly depending sides 217 extend towards the centre of the conveyor belt at an angle of approximately 45° from the vertical. This assists in keeping material away from the edges of conveyor belt 190, and thus debris from contacting the pulleys and rollers.

Skirts 218 may be formed from any suitably rigid material such as plastics, rubber, composites or metal. Preferably, skirts 218 are formed from polyurethane or rubber and are secured to downwardly depending sides 217 by a plurality of cooperating bolts and nuts. Depending upon the material or materials chosen for the skirts, other conventional fastening techniques such as, but not limited to, threaded screws, latches, clasps, split pins, clips or any other comparable releasable fastening means may be used. Preferably, a lower portion of skirts 218 extend towards the centre of the conveyor belt at an angle of approximately 60° from the vertical. This further assists in keeping material away from the edges of conveyor belt 190, and thus debris from contacting the pulleys and rollers.

The hopper 200 is removably mounted to the pair of chassis rails 100 that supports the conveyor belt 190. Preferably, the hopper 200 is bolted to the outwardly extending flange 195 of each chassis rail 100 plate using a plurality of cooperating bolts and nuts. Depending upon the material or materials chosen for the skirts, other conventional fastening techniques such as, but not limited to, threaded screws, latches, clasps, split pins, clips or any other comparable releasable fastening means may be used.

Figure 3:
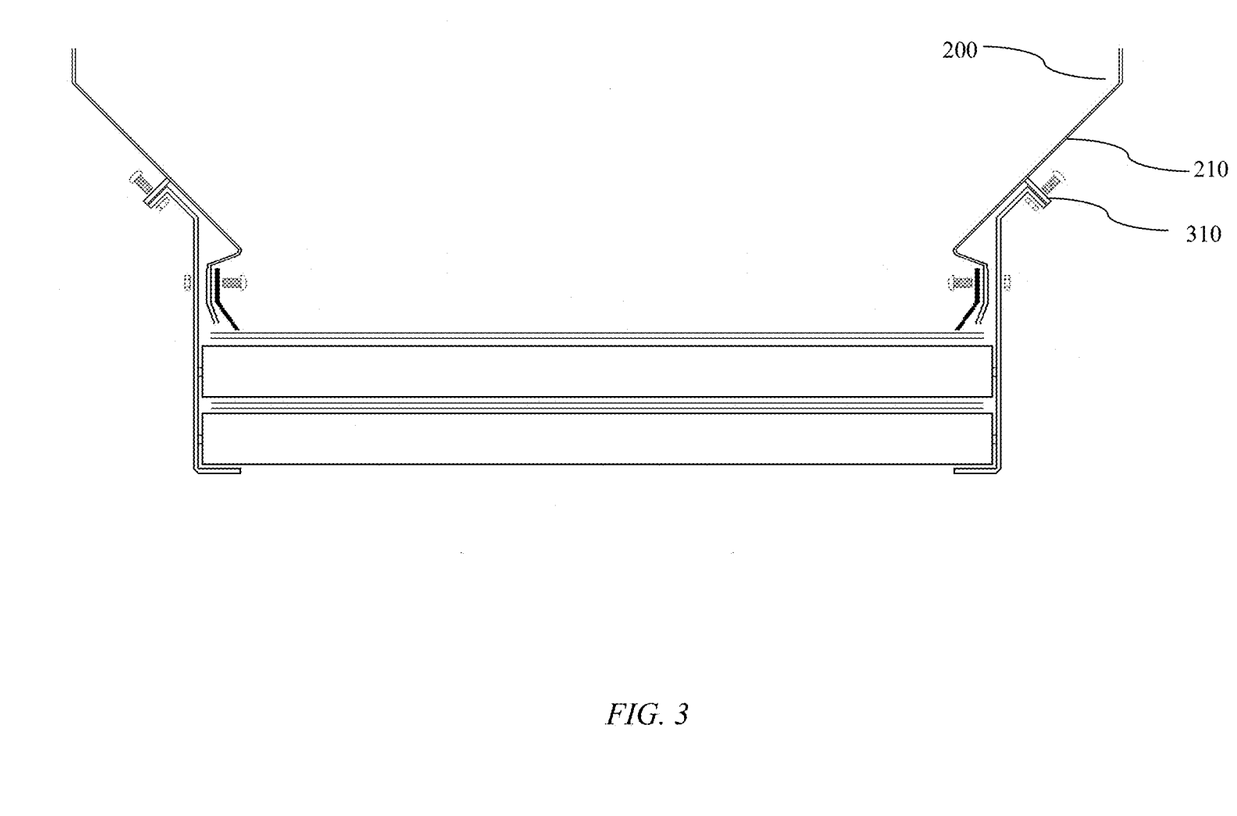
FIG. 3 is a cross sectional view of an alternative hopper comprising a support flange attached to a pair of chassis rails.

In an alternative embodiment, as shown in FIG. 3, hopper 200 comprises a support flange 310, which may be integrally formed with side 210 or attached to side 210, such as by welding. Support flange 310 assists in positioning the side 210 of hopper 200 upon outwardly extending flange 195. Preferably, support flange 310 directly abuts outwardly extending flange 195. Advantageously, support flange 310, and thus hopper 200, may be removably attached to outwardly extending flange 195 using a plurality of cooperating bolts and nuts. This arrangement protects the bolt heads, and allows for easier removal, than if side 210 is directly bolted to outwardly extending flange 195 as shown in FIG. 2.

As will be readily appreciated, this modular configuration of the chassis rail, rollers, hopper and the conveyor belt facilitates the separation of, and interchangeability between, the chassis rail, rollers, hopper and the conveyor belt for convenient maintenance of the chassis rail, rollers, hopper and/or the conveyor belt.

Figure 4:
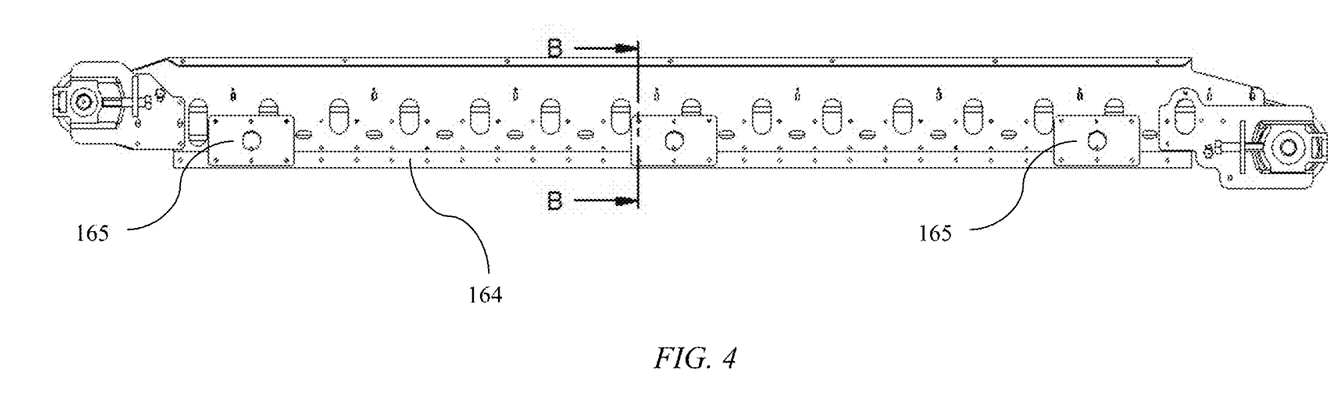
FIG. 4 is a side view of a chassis rail shown with side reinforcing plates.
Figure 5:
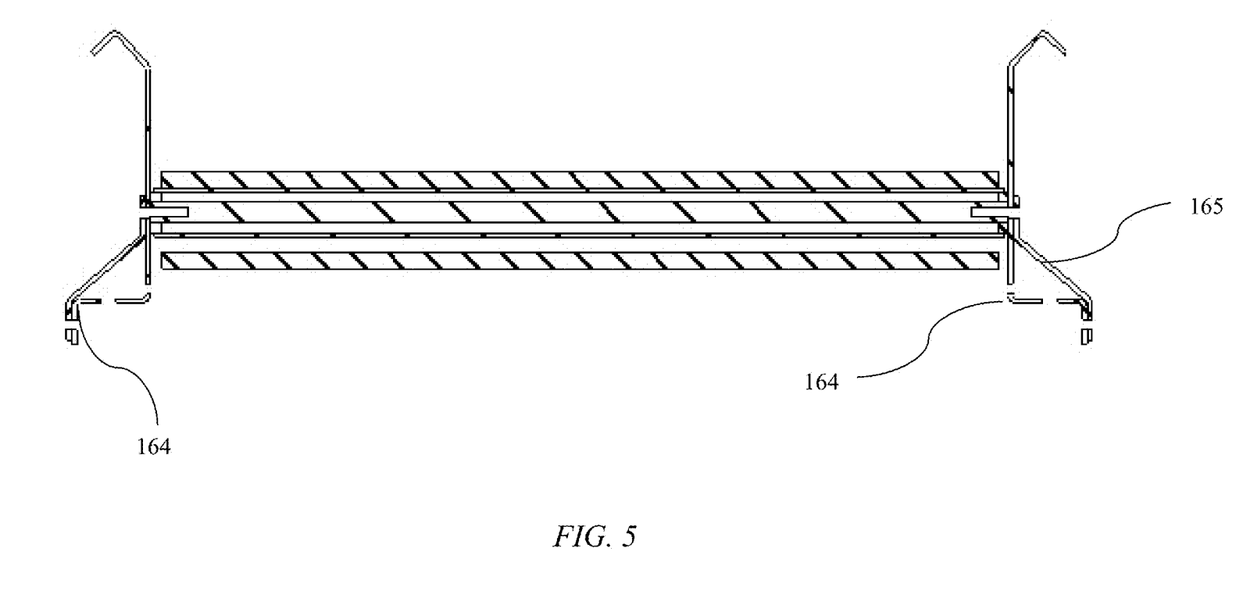
FIG. 5 is a cross-sectional view through line B-B of the chassis rail of FIG. 4.

To provide additional strength to the chassis rail, a number of side reinforcing plates 165 may be attached between a lower reinforcing flange 164 and the chassis rail 100 as shown in FIGS. 4 and 5. Lower reinforcing flange 164 may be integrally formed with the chassis rail or may be attached to the chassis rail, such as by welding, or a plurality of cooperating bolts and nuts.

Figure 6:
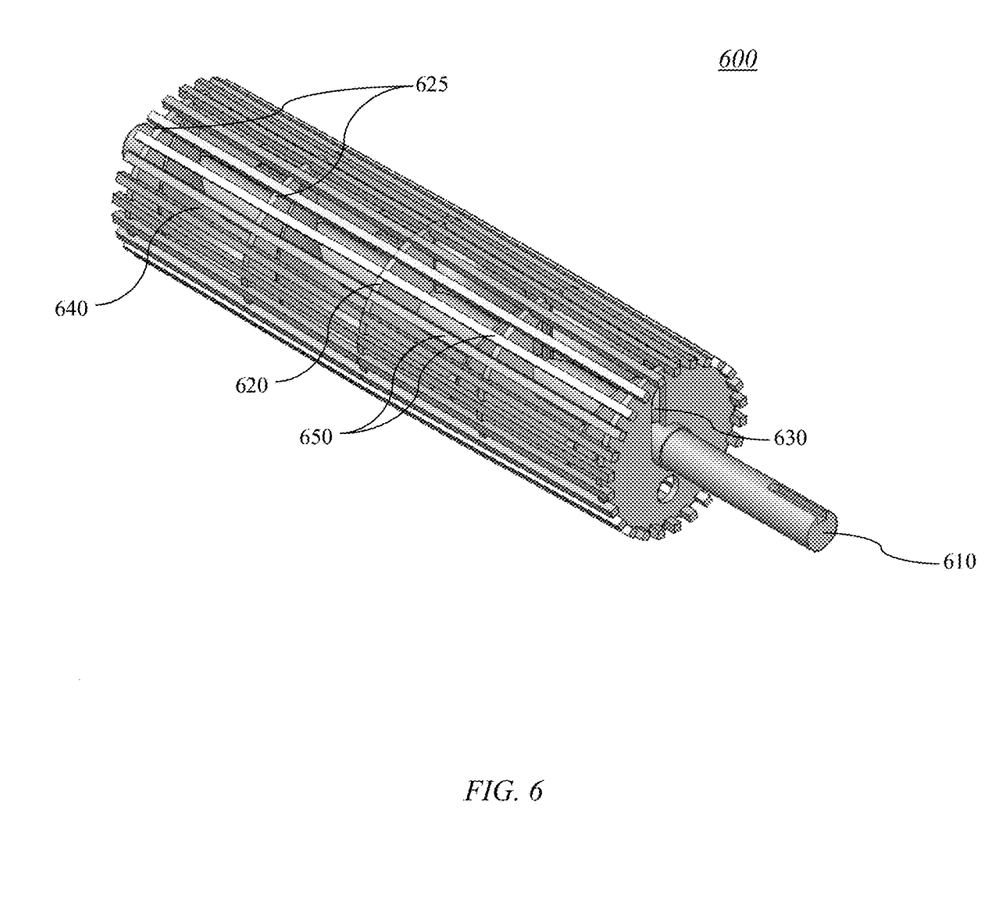
FIG. 6 is a right perspective view of a self-cleaning pulley suitable for use with the chassis rail.

To further aid the longevity of the conveyor belt mechanism, FIG. 6 shows a self-cleaning pulley 600, which is made from an elongated shaft 610, a central support plate 620 and a plurality of peripheral support plates 625 evenly spaced along the shaft. The shaft 610 can be a solid shaft or a hollow shaft of substantially constant outside diameter, and is rotatably supported by suitable bearings. The central support plate 620 comprises a solid, heavy, flat disc, having no openings therethrough except for a central opening through which shaft 610 is inserted. Each peripheral support plate 625 has an opening 630 which debris can pass through, so as to eventually fall clear of a conveyor belt (not shown). The outer diametrical size of central support plate 620 and peripheral support plates 625 is substantially identical.

A plurality of auger members 640 are affixed to the shaft between the peripheral support plates 625. A plurality of spaced-apart frame members 650 are affixed to the support plates 620 and 625 to form the outer surface of the pulley 600. Preferably, frame members 650 extend substantially parallel to the shaft 610. The spaced-apart frame members 650 provide support for the conveyor belt whilst allowing debris to fall between the spaced-apart frame members to be carried away by auger members 640. The frame members 650 provide additional strength to the pulley over conventional arrangements. This significantly extends the life of the pulley and the conveyor belt which is in contact with it.

Preferably, the components are made from various grades of hot-rolled steel, various grades of cold-rolled steel, or from stainless steel, titanium or the like, and may be welded together to form a single rigid assembly. Alternatively, the components could also be made of any other suitably rigid material such as plastics (e.g. nylon), composites (e.g. fiberglass and/or carbon fibre construction), ceramics, or other materials which can support a heavy load. The self-cleaning pulley is suitable for use where any conventional pulley, roller or like device is used.

Figure 7:
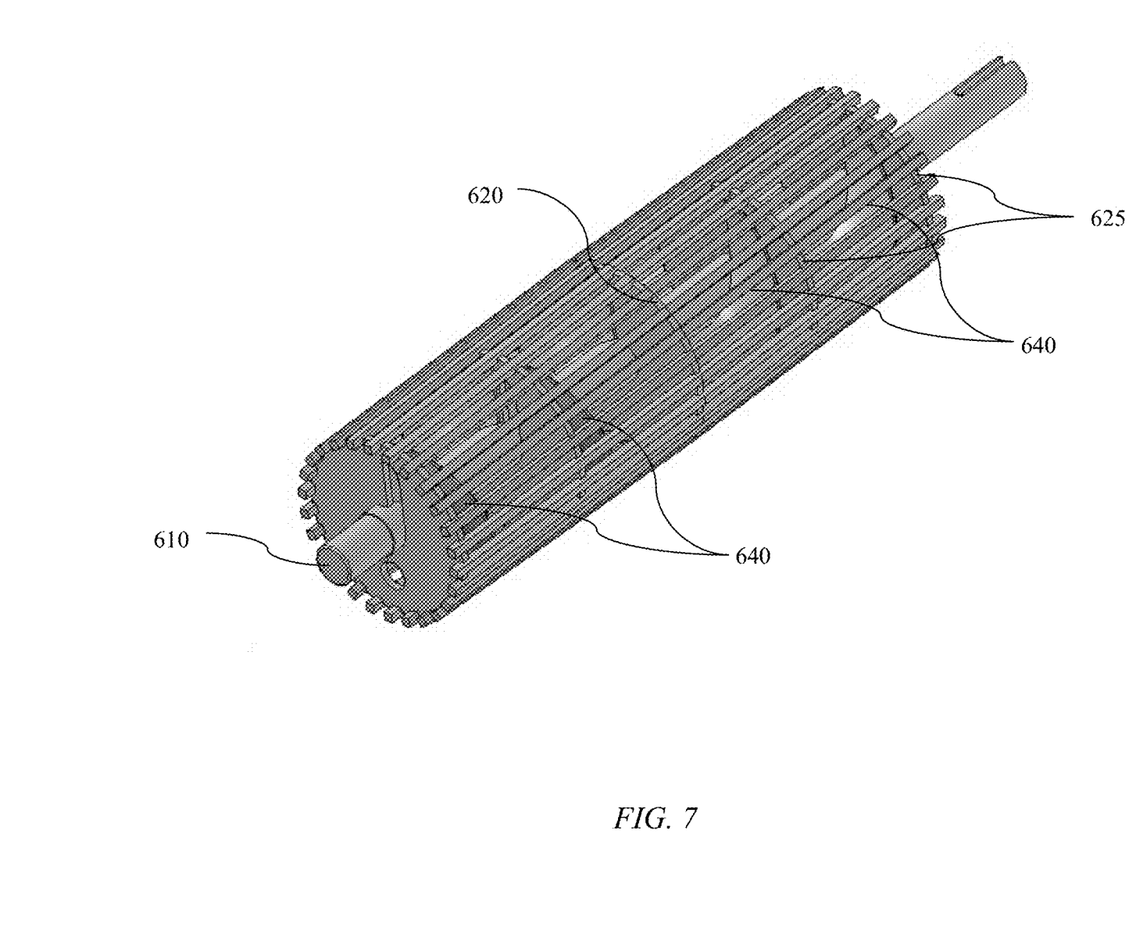
FIG. 7 is a left perspective view a self-cleaning pulley suitable for use with the chassis rail.

As seen in FIG. 7, each auger member 640 comprises a spiral flight portion which extends around the shaft 610, and has an effective outside diameter that is substantially constant and identical to the outer diameter of the peripheral support plates 625. The auger members spiral in opposite directions from the central support plate 620 so as to direct any trapped debris away from the centre of the pulley; ie. the augers are spiralled in opposite directions, one spiralling clockwise, and the other anti-clockwise.

Figure 8:
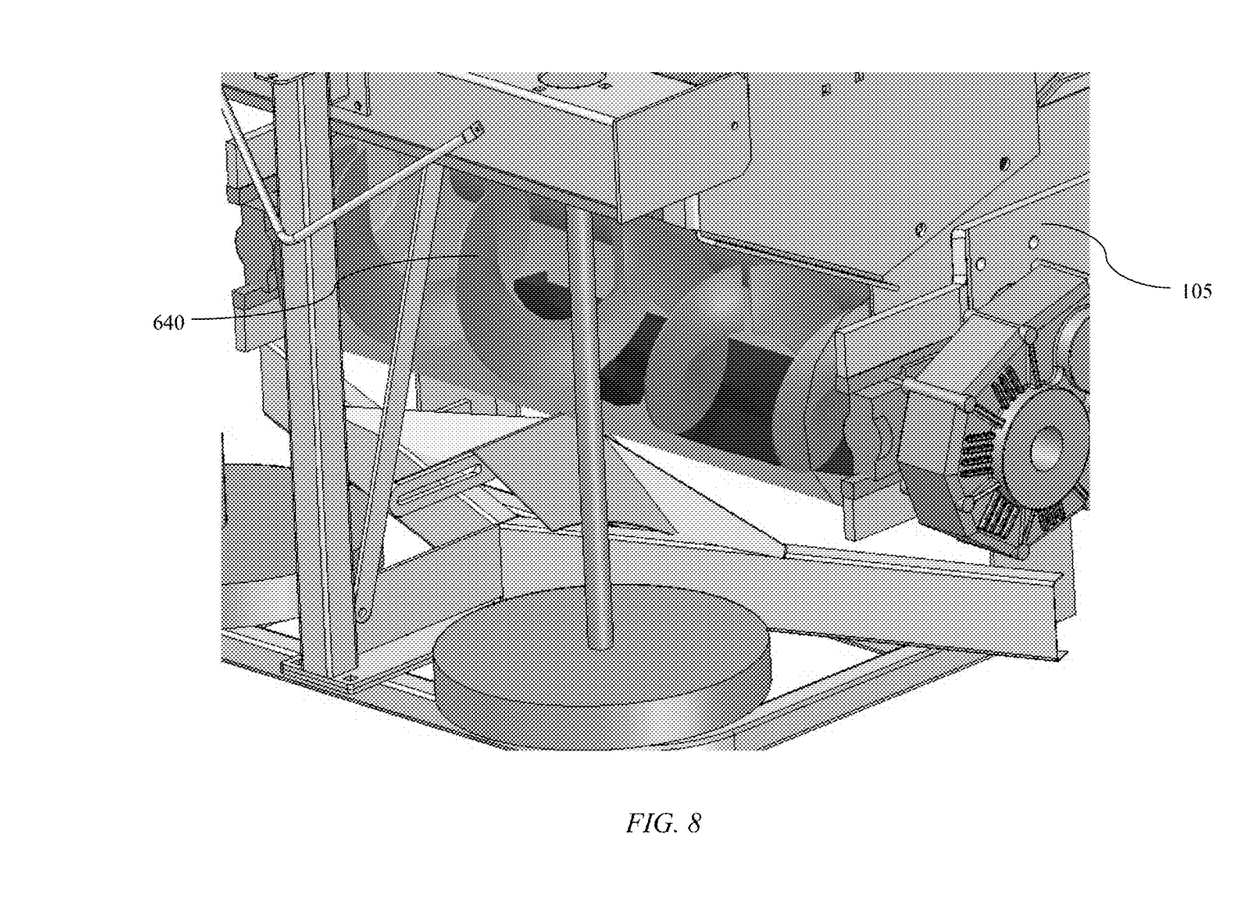
FIG. 8 is an enhanced view of the self-cleaning pulley attached to the chassis rail.
Figure 9:
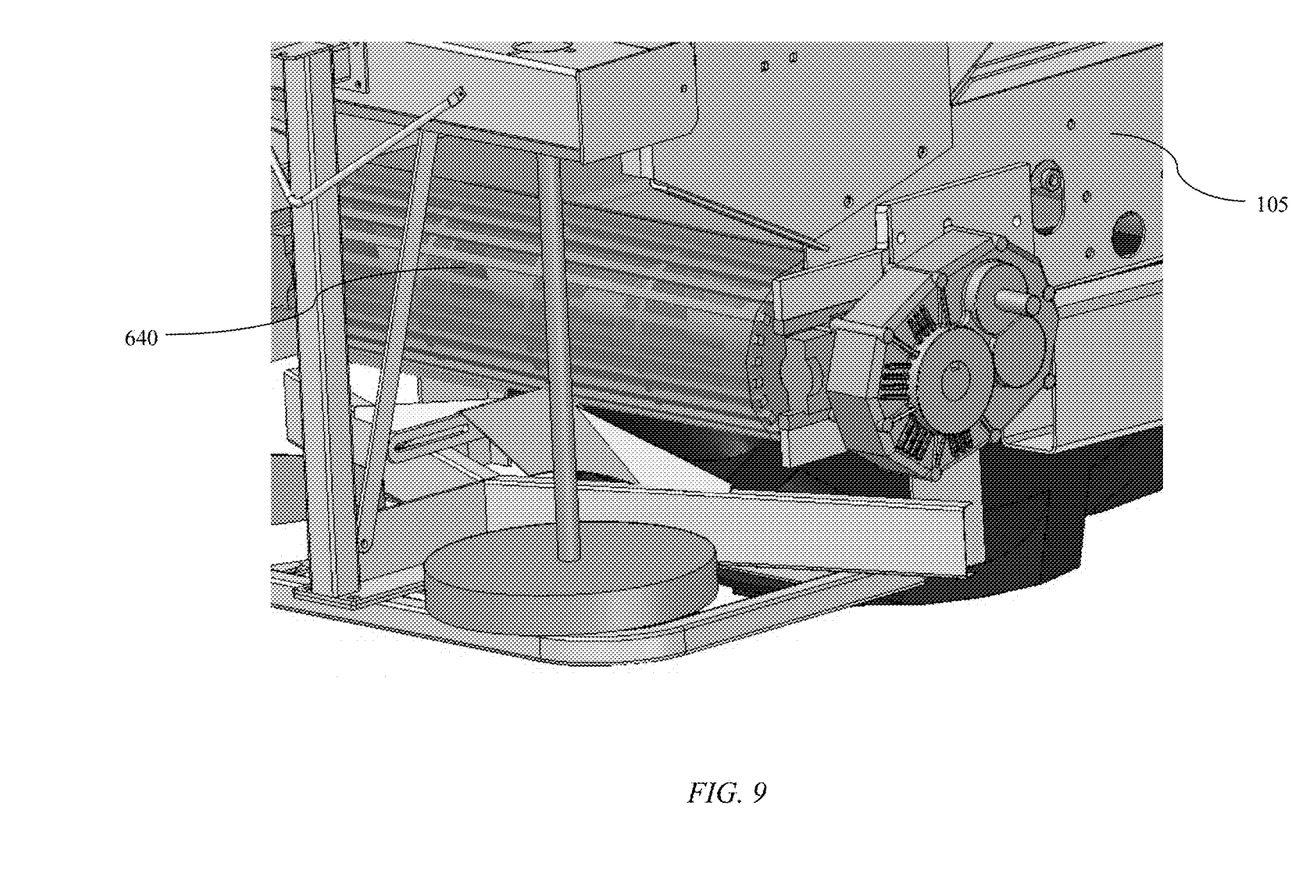
FIG. 9 is a perspective view of the self-cleaning pulley attached to the chassis rail.

As shown in FIGS. 8 and 9, the self-cleaning pulley 600 can be mounted to chassis rail 105, so as to carry a conveyor belt (not shown) thereon. During operation of the conveyor, the belt travels around the head and tail pulleys, so that material placed upon the top run is carried from one pulley (which serves as a tail pulley) toward the other (which serves as a head pulley). Accordingly, any debris that falls upon the top of the lower run tends to accumulate under the tail pulley, if such a pulley is of conventional type. However, if the tail pulley is of the self-cleaning type, the debris arriving under the tail pulley is immediately moved in transverse directions by means of the augers members; each rotating so that its spiral turns advance toward an opposite outer end of the pulley. Thus, any debris falling between the conveyor belt and shaft 610 is carried away from the belt crown and toward the belt side edges 28, from where it drops off. Each auger, accordingly, sweeps the debris that falls off from one half of the belt. The head pulley, likewise, can sweep off the underside of the top run as the conveyor belt comes into contact with the head pulley, thereby removing any sticky debris.

Figure 10:
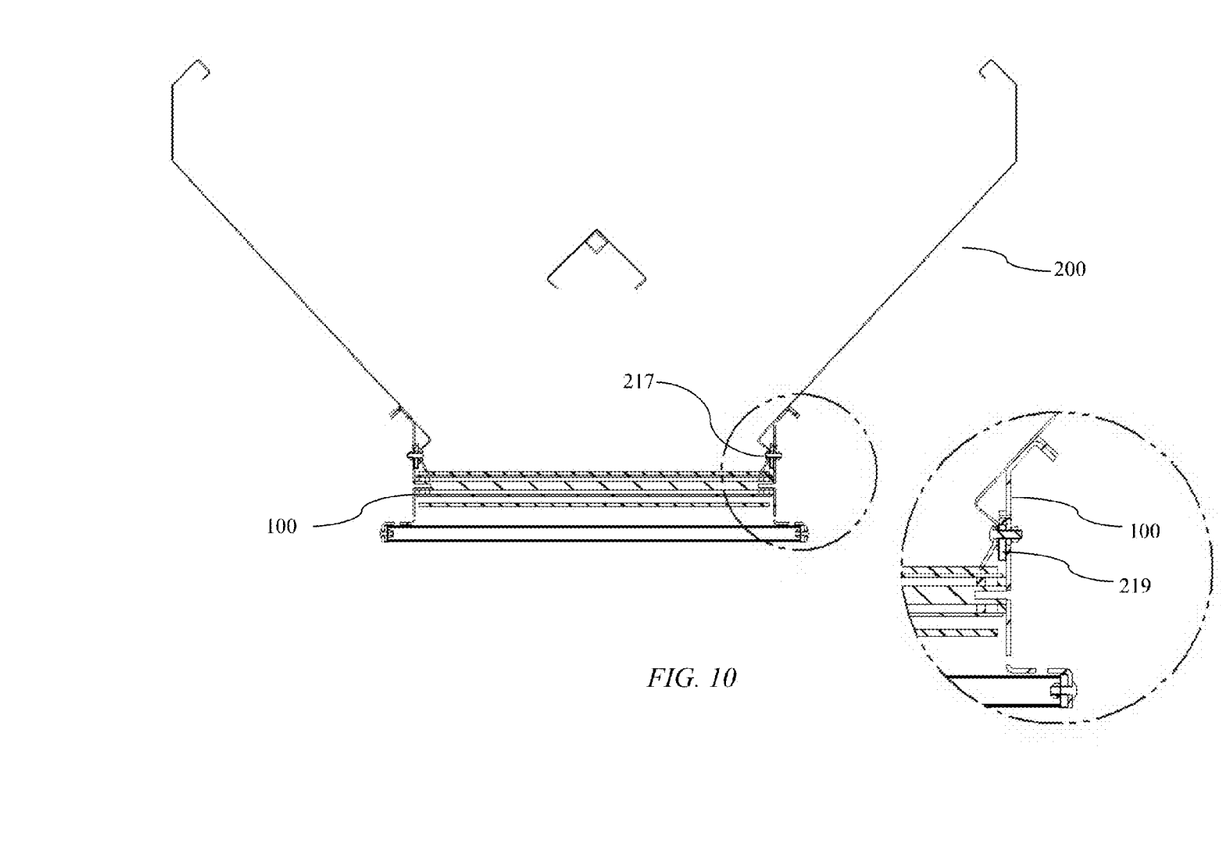
FIG. 10 is a cross-sectional view through the broadcast spreader showing a spacer block located between the chassis rail and hopper.

To further increase strength and longevity, spacer blocks 219 may be fitted between the chassis rails 100 and the downwardly depending sides 217 of the hopper 200. A plurality of spacer blocks may be placed between the chassis rails and hopper. Preferably, the spacer blocks are located at the point a nut and bolt are used to join the hopper to the chassis rail, as shown in FIG. 10. Alternatively, the spacer blocks may be a continuous member that extends the length of the hopper, further increasing horizontal strength.

Figures 11, 12, 13, 14:
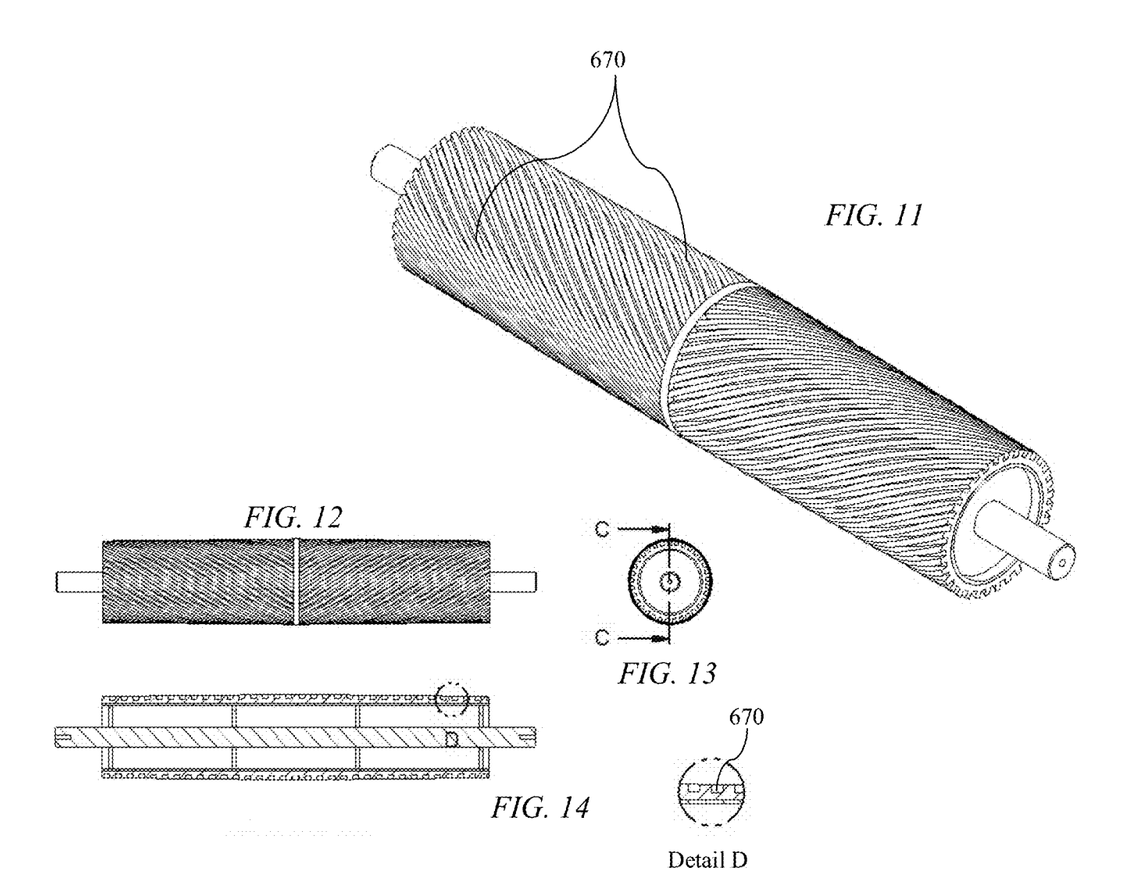
FIG. 11 is a right perspective view of an alternative embodiment of the self-cleaning pulley suitable for use with the chassis rail.
FIG. 12 is a front view of the self-cleaning pulley of FIG. 11.
FIG. 13 is a side view of the self-cleaning pulley of FIG. 11.
FIG. 14 is a cross-sectional view through line C-C of the self-cleaning pulley of FIG. 13.

An alternative embodiment of a self-cleaning pulley is shown in FIGS. 11 to 14. In this embodiment, the upper surface of the pulley is formed with a plurality of spiral grooves or channels 670 which serve to direct any debris which falls onto the pulley away from the belt crown and toward the belt edges, from where it drops off. One advantage of this arrangement is that the pulley can be sealed, which effectively prevents debris from entering the interior of the pulley. To aid transport of any debris toward the ends of the roller, the outer diameter at the longitudinal centre of the roller may be greater than the outer diameter of the roller at each end, such that the roller tapers from the middle to each end, as can be seen in FIG. 12. The rate of taper may be constant or may comprise a series of 'steps'.

The grooves or channels 670 preferably have a substantially rectangular cross-section, as can be seen in FIG. 13 and FIG. 14. Alternatively, the grooves could be semicircular, ovoid, square or v-shaped in cross section. Preferably, the groves are formed directly in the upper surface of the pulley, which may be made from various grades of hot-rolled steel, various grades of cold-rolled steel, or from stainless steel, titanium or the like. Alternatively, the grooves could also be formed in any other suitably rigid material such as rubber, plastics (e.g. nylon), composites (e.g. fiberglass and/or carbon fibre construction), ceramics, or suitable materials. The grooves are spiralled in opposite directions, one spiralling clockwise, and the other anti-clockwise from the centre of the pulley.

The chassis rail and hopper combination may be mounted on a trailer for transport thereby. To aid the distribution of particulate matter from the hopper, the chassis rail may be inclined with respect to the trailer such that gravity assists the flow of material from the tail pulley to the head pulley along the conveyor belt. Alternatively, the chassis rail may be generally wedged shaped, with apertures 120 evenly spaced from the upper edge of the chassis rail and inclined to the horizontal. In an alternative embodiment, the hopper may be detached from the chassis rail to allow materials such as hay bales to be carried and distributed.

The reference to any prior art in this specification is not, and should not be taken as, an acknowledgement or any form of suggestion that the prior art forms part of the common general knowledge in any jurisdiction.

Non-limiting examples of the invention include:

1. A chassis rail comprising:
   an elongate frame member having a first end for mounting a head pulley and a second end for mounting a tail pulley;
   a first plurality of spaced-apart apertures to allow visual inspection of a plurality of bed rollers; and
   a second plurality of spaced-apart apertures to allow visual inspection of a plurality of return rollers.

2. The chassis rail according to example 1, wherein the first plurality of spaced-apart apertures is substantially evenly spaced.

3. The chassis rail according to example 2, wherein the second plurality of spaced-apart apertures is substantially evenly spaced.

4. The chassis rail according to example 3, wherein the first plurality of spaced-apart apertures is formed between every other pair of bed rollers.

5. The chassis rail according to example 4, wherein the second plurality of spaced-apart apertures is formed between every other pair of return rollers.

6. The chassis rail according to example 5, wherein the chassis rail includes an outwardly extending flange.

7. A broadcast spreader comprising:
   a pair of chassis rails, wherein each chassis rail includes:
      an elongate frame member having a first end for mounting a head pulley and a second end for mounting a tail pulley;
      a first plurality of spaced-apart apertures to allow visual inspection of a plurality of bed rollers; and
      a second plurality of spaced-apart apertures to allow visual inspection of a plurality of return rollers;
   each chassis rail including an outwardly extending upper flange;
   a hopper having an upper portion and a lower portion, the upper portion having two side walls which inwardly converge, and a lower portion in which the side walls outwardly diverge and then extend substantially vertical;
   wherein the upper portion of the hopper is supported by the outwardly extending upper flanges and the lower portion of the hopper is removably secured to the chassis rails.

8. The broadcast spreader according to example 7, wherein the side walls have a support flange which abuts the outwardly extending upper flange.

9. The broadcast spreader according to example 9, wherein the hopper is removably secured to the outwardly extending upper flange.

10. The broadcast spreader according to example 10, further including an endless conveyor belt disposed about transversely extending pulleys.

11. The broadcast spreader according to example 11, wherein the side walls are provided with skirts that act as an intermediary between the hopper and the conveyor belt.

12. The broadcast spreader according to example 11, wherein the skirts are formed from rubber.

13. The broadcast spreader according to example 7, further comprising at least one self-cleaning pulley.

14. The broadcast spreader according to example 13, wherein the self-cleaning pulley comprises a plurality of spaced-apart support plates with openings, affixed on a shaft having a first end and a second end;
   a plurality of spaced-apart frame members affixed to the support plates to form an outer surface of the pulley, and
   a plurality of auger members affixed to the shaft between said support plates, wherein each auger member has a spiral flight portion extending around said shaft to direct debris from a centre portion of the shaft towards the ends of the shaft for expulsion through the openings of the support plates.

15. The broadcast spreader according to example 14 wherein the spaced-apart frame members are evenly spaced.

16. The broadcast spreader according to example 15, wherein the plurality of spaced-apart support plates are substantially equal in outer diametrical size.

17. The broadcast spreader according to example 16, wherein the shaft has a substantially constant outside diameter.

18. The broadcast spreader according to example 17, wherein the spiral flight portion has a substantially constant effective outside diameter.

19. The broadcast spreader according to example 18, wherein the frame members extend substantially parallel to the shaft.

20. The broadcast spreader according to example 13, wherein the self-cleaning pulley is formed with a plurality of spiral grooves or channels.

Although the invention has been disclosed in its preferred forms, it is to be understood that the above embodiments have been provided only by way of exemplification of this invention, and that further modifications and improvements thereto, as would be apparent to persons skilled in the relevant art, are deemed to fall within the broad scope and ambit of the current invention described and claimed herein.

The invention claimed is:

1. A broadcast spreader comprising:
 a pair of chassis rails, wherein each chassis rail includes:
  an elongate frame member having a first end for mounting a head pulley and a second end for mounting a tail pulley;
  a first plurality of spaced-apart apertures to allow visual inspection of a plurality of bed rollers; and
  a second plurality of spaced-apart apertures to allow visual inspection of a plurality of return rollers;
 each chassis rail including an outwardly extending upper flange;
 a hopper having an upper portion and a lower portion, the upper portion having two side walls which inwardly converge, and a lower portion in which the side walls outwardly diverge and then extend substantially vertical;
 wherein the upper portion of the hopper is supported by the outwardly extending upper flanges and the lower portion of the hopper is removably secured to the chassis rails.

2. The broadcast spreader according to claim 1, wherein the side walls have a support flange which abuts the outwardly extending upper flange.

3. The broadcast spreader according to claim 2, wherein the hopper is removably secured to the outwardly extending upper flange.

4. The broadcast spreader according to claim 1, further including an endless conveyor belt disposed about transversely extending pulleys.

5. The broadcast spreader according to claim 4, wherein the side walls are provided with skirts that act as an intermediary between the hopper and the conveyor belt.

6. The broadcast spreader according to claim 5, wherein the skirts are formed from rubber.

7. The broadcast spreader according to claim 1, further comprising at least one self-cleaning pulley.

8. The broadcast spreader according to claim 7, wherein the self-cleaning pulley comprises a plurality of spaced-apart support plates with openings, affixed on a shaft having a first end and a second end;
 a plurality of spaced-apart frame members affixed to the support plates to form an outer surface of the pulley, and
 a plurality of auger members affixed to the shaft between said support plates, wherein each auger member has a spiral flight portion extending around said shaft to direct debris from a center portion of the shaft towards the ends of the shaft for expulsion through the openings of the support plates.

9. The broadcast spreader according to claim 8 wherein the spaced-apart frame members are evenly spaced.

10. The broadcast spreader according to claim 9, wherein the plurality of spaced-apart support plates are substantially equal in outer diametrical size.

11. The broadcast spreader according to claim 10, wherein the shaft has a substantially constant outside diameter.

12. The broadcast spreader according to claim 11, wherein the spiral flight portion has a substantially constant effective outside diameter.

13. The broadcast spreader according to claim 12, wherein the frame members extend substantially parallel to the shaft.

14. The broadcast spreader according to claim 7, wherein the self-cleaning pulley is formed with a plurality of spiral grooves or channels.

* * * * *